United States Patent [19]
Brown et al.

[11] Patent Number: 6,055,370
[45] Date of Patent: Apr. 25, 2000

[54] APPARATUS WHICH ALLOWS DATA SHARING AMONGST COMPUTER PROGRAMS FROM DIFFERENT PROGRAM ENVIRONMENTS

[75] Inventors: Marsha Ann Brown, Manassas, Va.; Richard Aime Demers; James Alan Diephuis, both of Rochester, Minn.; Lorenzo Falcon, Jr.; Thomas E. Frayne, both of San Jose, Calif.; Sunil Sharadchandra Gaitonde, Rochester, Minn.; Elaine Szafir Patry; William Remay, both of Warrenton, Va.; Kenneth Mark Sissors, Centreville, Va.; Ejuana D. Vasquez, Raleigh, N.C.; David Joseph Weber, Rochester, Minn.; Koichi Yamaguchi, Los Gatos, Calif.

[73] Assignee: International Business Machines Corporation, Armonk, N.Y.

[21] Appl. No.: 08/655,336

[22] Filed: May 24, 1996

Related U.S. Application Data

[62] Division of application No. 08/286,498, Aug. 4, 1994, Pat. No. 5,557,776, which is a continuation of application No. 07/885,086, May 18, 1992, abandoned.

[51] Int. Cl.[7] .................................................. G06F 9/45
[52] U.S. Cl. .............................................................. 395/705
[58] Field of Search .................................... 395/800, 700, 395/600, 705

[56] References Cited

U.S. PATENT DOCUMENTS

| | | | |
|---|---|---|---|
| 4,141,005 | 2/1979 | Bonner et al. | 340/347 |
| 4,202,040 | 5/1980 | Whitworth et al. | 364/900 |
| 4,667,290 | 5/1987 | Goss et al. | 395/700 |
| 4,949,291 | 8/1990 | Saini | 364/715.03 |
| 5,187,787 | 2/1993 | Skeen et al. | 395/600 |

*Primary Examiner*—John A. Follansbee
*Attorney, Agent, or Firm*—Steven W. Roth

[57] ABSTRACT

The ADL system provides a way in which computer programs written in different programming languages can share data. The ADL system comprises the ADL language and the facilities necessary to perform the data sharing function. The ADL language uses the concept of a data description and conversion module. A data description and conversion module, or more simply, an ADL module, is composed of declarations and plans. Each declaration is an ADL description of how a particular program environment represents data. The plan portion of the ADL module contains ADL statements that instruct the computer system to convert the data representations of the source program environment into the data representations of the target program environment.

19 Claims, 18 Drawing Sheets

FIG. 2A

```
Source  : DECLARE /* Declaration statement for Source program */
  205    220  BEGIN;
              215
              DEFAULT /* Use the following default data types */
              225      /* and attributes for the Source program */
                    BINARY  232
                    SIGNED (FALSE)
              230    234 base: CONSTANT 10; /* Create the constant base of */
                235  236    /* value 10 */
         structure_A: SEQUENCE  240  242  243
                     BEGIN;
                        var_1: BINARY RADIX (base);
                        var_2: ARRAY MAXALC (FALSE)
                                    DMNLST (DMNHIGH (10))
                                           DMNHIGH (12))
                                    244
                                    OF CHAR;
                     END;
         END;
         225   245

Target  : DECLARE /* Declaration statement for Target program */
  210    BEGIN;
         DEFAULT /* Use the following default data types */
                 /* and attributes for the Target program */
         230      BINARY  232
                  SIGNED (TRUE)
                  234 base: CONSTANT 10; /* Create the constant base of */
                            /* value 10 */
```

200

```
source: DECLARE
        BEGIN;
    X:  SEQUENCE              300
301     BEGIN;
        A: BINARY LENGTH (16);   305
        B: CHAR LENGTH (6);      310
        C: FLOAT FORM (FB32);    315
        D: ENUMERATION (red, blue, green);  320
        END;
    END;

target: DECLARE
        BEGIN;
    X:  SEQUENCE              330
331     BEGIN;
        D: ENUMERATION (red, blue, green);  335
        B: CHAR LENGTH (6);      340
        A: BINARY LENGTH (16);   350
        END;
    END;
```

FIG. 3

```
source: DECLARE—400
        BEGIN;
          X:SEQUENCE—405
            BEGIN;
              A: BINARY—410
              B: CASE—415
                BEGIN;
420——B1:      WHEN A = 1 THEN  C: CHAR LENGTH (4);
430——B2:      WHEN A = 2 THEN  D: FLOAT FORM (FB32);
440——B3:      WHEN A = 3 THEN  E: BINARY LENGTH (3);
450——B4:      OTHERWISE        F: ASIS LENGTH (4);
                END;
            END;
        END;

target; DECLARE—452
        BEGIN;
          X:SEQUENCE—453
            BEGIN;
              A: BINARY—454
              B: CASE—455
                BEGIN;
460——B1:      WHEN A = 1 THEN  C: CHARPRE LENGTH (4);
470——B2:      WHEN A = 2 THEN  D: ASIS LENGTH (4);
480——B3:      WHEN A = 3 THEN  E: BINARY LENGTH (3);
490——B4:      OTHERWISE        F: ASIS LENGTH (4);
                END;
            END;
        END;
```

FIG. 4

TO DATA TYPES

| FROM DATA TYPES | ARRAY | ASIS | BINARY | BIT | BITPRE | BOOLEAN | CASE | CHAR | CHARPRE | CHARSFX | ENUMERATION | FLOAT | PACKED | SEQUENCE | ZONED |
|---|---|---|---|---|---|---|---|---|---|---|---|---|---|---|---|
| ARRAY | X | X | | | | | | | | | | | | | |
| ASIS | X | X | X | X | X | X | X | X | X | X | X | X | X | X | X |
| BINARY | | X | X | | | | | | | | X | X | X | | X |
| BIT | | X | X | X | | | | | | | | | | | |
| BITPRE | | X | | X | X | | | | | | | | | | |
| BOOLEAN | | X | | | | X | | | | | | | | | |
| CASE | | X | | | | | X | | | | | | | | |
| CHAR | | X | | | | | | X | X | X | | | | | |
| CHARPRE | | X | | | | | | X | X | X | | | | | |
| CHARSFX | | X | | | | | | X | X | X | | | | | |
| ENUMERATION | | X | X | | | | | | | | X | | X | | X |
| FLOAT | | X | X | | | | | | | | | X | X | | X |
| PACKED | | X | X | | | | | | | | X | X | X | | X |
| SEQUENCE | | X | | | | | | | | | | | | X | |
| ZONED | | X | X | | | | | | | | X | X | X | | X |

ADL Data Type Conversion Table.
X     Conversion supported by ADL
blank     Conversion not supported by ADL

FIG. 5

APPARATUS WHICH ALLOWS DATA SHARING AMONGST COMPUTER PROGRAMS FROM DIFFERENT PROGRAM ENVIRONMENTS

This is a divisional of 08/286,498, filed Aug. 14, 1994 now U.S. Pat. No. 5,557,776, which is a continuation of 07/885,086, filed May 18, 1992, now abandoned.

FIELD OF THE INVENTION

This invention relates to the data processing field. More specifically, this invention relates to the sharing of data amongst computer programs written in different programming languages for different types of computer systems.

BACKGROUND OF THE INVENTION

As with the world itself, typical computer systems include a variety of separate entities which use different languages. The difference is, of course, that computer systems use programming languages instead of spoken languages. Different programming languages are needed because the variety of tasks which are performed on today's computer systems are usually implemented best when the language used is one designed for the particular purpose at hand. To facilitate the use of several languages, computer systems include programs called compiler programs. Compiler programs are responsible for reducing a human readable computer language into machine readable form. Generally, for each type of computer system there is one compiler program per computer language. Since different computer systems use different machine languages, each compiler program is responsible for reducing a particular programming language into an internal form which is understood by that particular computer system. Individuals skilled in the use of a particular programming language use the language to write computer programs which are translated into the appropriate internal form by the appropriate compiler program. A particular programming language and the internal form generated by the compiler program for use by the computer system can be said to make up a program environment.

As stated, the ability of a computer system to support multiple program environments is desirable in that each program environment can be tailored to perform a different task. In pursuit of this flexibility, computer system manufacturers are designing their computer systems to accommodate more and more program environments. Indeed, critical to the commercial success of a particular computer system is how many program environments it can support. Modern day computer systems can support a number of program environments. For example, the IBM Personal System/2 model 80 can support the C, PASCAL, FORTRAN, COBOL, and BASIC programming languages with the OS/2 and DOS operating systems. This flexibility is not without cost, however. The negative side of supporting a variety of program environments is the difficulty of sharing information. Information sharing is significant in that it eliminates the need to redundantly create or obtain information that already exists. Time and expense are saved whenever the information of one program environment can be used by the computer programs of another program environment.

However, information sharing amongst computer programs of different program environments is more easily said than done. As computer systems become more and more open and flexible, information sharing becomes more and more difficult. Associated with the addition of each program environment is a new way of handling data. Computer programmers may spend a great deal of time and expense writing computer programs which can accommodate the data handling method of a different program environment. In addition to writing or modifying computer programs which can themselves share data, computer programmers also write separate computer programs which have as their sole purpose the conversion of data from one program environment into a form understandable by the computer programs of another program environment.

The problem with solutions of this type is that they are constrained to the view of their own program environment. That is, all computer programs must describe the data in the way prescribed by their own native computer language. This causes several problems. First, since different programming languages are designed to create computer programs which perform different categories of tasks, the methods used to describe data in one program environment seldom correlate directly to the methods used to describe data in another program environment. The problem becomes more acute when one remembers that program environments differ based on computer systems as well as programming languages. Hence, even though two program environments have the same programming language, the way in which data is represented will probably be different if the program environments reside on different computer systems.

The second problem associated with existing data sharing implementations is that computer programmers must intimately understand how data is described in their own program environment, how data is described in the program environment from which the data is to be converted, and how the subject computer systems represent the data. This complexity makes for a difficult, cumbersome, and costly effort.

The third problem associated with existing data sharing implementations is that the programming languages of existing program environments are not designed for writing computer programs to facilitate data sharing. Hence, the ways in which a particular programming language describes data are not readily adaptable to describing how another language may describe data, or for that matter, how another computer system may represent data.

These problems leave computer programmers between the proverbial "rock and a hard place." It is extremely inefficient to write computer programs to create or obtain data which already exists, but attempting to write a computer program which can share data may in the end prove to have been more costly than simply "starting from scratch."

SUMMARY OF THE INVENTION

It is a principal object of this invention to provide an enhanced programming language which describes the data types and internal representations of various other programming languages for various computer systems.

It is another object of this invention to provide an enhanced method and apparatus for creating computer programs which facilitate data sharing amongst computer programs of different program environments.

It is still another object of this invention to provide an enhanced method and apparatus for using computer programs designed to facilitate the sharing of data amongst computer programs of different program environments.

These and other objects are accomplished by the data language disclosed herein.

ADL is defined in the IBM document "Distributed Data Management Architecture, Specifications for A Data Language" which is attached as Appendix 1. This document was unpublished as of the filing date of the patent application. Although the acronym ADL stands for "A Data Language," the invention disclosed herein involves more than the language itself. The disclosed invention includes those facilities necessary to fully utilize the power of the ADL language. For this reason, the acronym ADL is often used within this description to refer to the ADL system or environment as a whole.

The ADL system provides a way in which computer programs written in different programming languages can share data. As stated, the ADL system comprises the ADL language and the facilities necessary to perform the data sharing function. The ADL language uses the concept of a data description and conversion module. A data description and conversion module, or more simply, an ADL module, is composed of declarations and plans. Each declaration is an ADL description of how a particular program environment represents data. Since ADL has been designed for this purpose, data descriptions are more clearly and efficiently defined. Each ADL module will contain one data declaration for the source program environment and one data declaration for the target program environment. That is, an ADL module will contain an ADL description of how each program environment represents data for the subject computer system. These ADL data descriptions can also be thought of as intermediate data descriptions since they ultimately provide a bridge between different program environments.

The plan portion of the ADL module contains ADL statements that instruct the computer system to convert the data representations of the source program environment into the data representations of the target program environment. A plan does not, however, specify how to perform the conversions. Instead, the ADL compiler infers the requisite conversions from the ADL source and target declarations contained in the ADL module.

There are two ways in which an ADL module can be created. The ADL module can be constructed through user input (i.e., A computer programmer, knowledgeable in the subject program environments and ADL, can write the ADL module using the ADL language) or through automatic translation of an existing data description. Creating the ADL module through user input requires the programmer to have detailed knowledge about both program environments and ADL. Further, since internal representations vary from computer system to computer system, the programmer must also understand how each computer system represents the data of each programming language. It is for this reason that the ADL system includes a "parse" mechanism which converts the data descriptions of a particular program environment into an ADL data description. In addition, the ADL system includes a "translate" mechanism and a "generate" mechanism. The "translate" mechanism translates an ADL data description for one program environment into an ADL data description for another program environment while the "generate" mechanism generates a data description for a particular programming language from an existing ADL data description. These capabilities add efficiency to the ADL system in that it is not necessary for a programmer to have particularized knowledge regarding each language and how data is represented by the subject computer system.

Once the ADL module has been created, it is compiled into an executable ADL conversion program. These ADL conversion programs are used to allow data sharing amongst computer programs from different program environments. To use data from another program environment, a computer program can call an ADL conversion program directly or the function may be incorporated into lower level utilities which automatically use the correct ADL conversion program whenever it is necessary to share data amongst computer programs from different program environments. In either case, ADL allows computer programs to share data regardless of the program environments involved. Examples include the ability to: obtain data created and stored by other computer programs, exchange messages with other computer programs, invoke the procedures of other computer programs, and invoke the procedures of computer programs which reside on different computer systems.

BRIEF DESCRIPTION OF THE DRAWINGS

FIGS. 2A and 2B hows an example ADL module.

FIG. 3 shows an example of the use of the ADL SEQUENCE statement.

FIG. 4 shows an example of how the ADL SEQUENCE statement and the ADL CASE statement can be used together within the declaration section of an ADL module.

FIG. 5 shows a conversion grid for ADL data types.

DESCRIPTION OF THE PREFERRED EMBODIMENT

Figures 1, 10A:
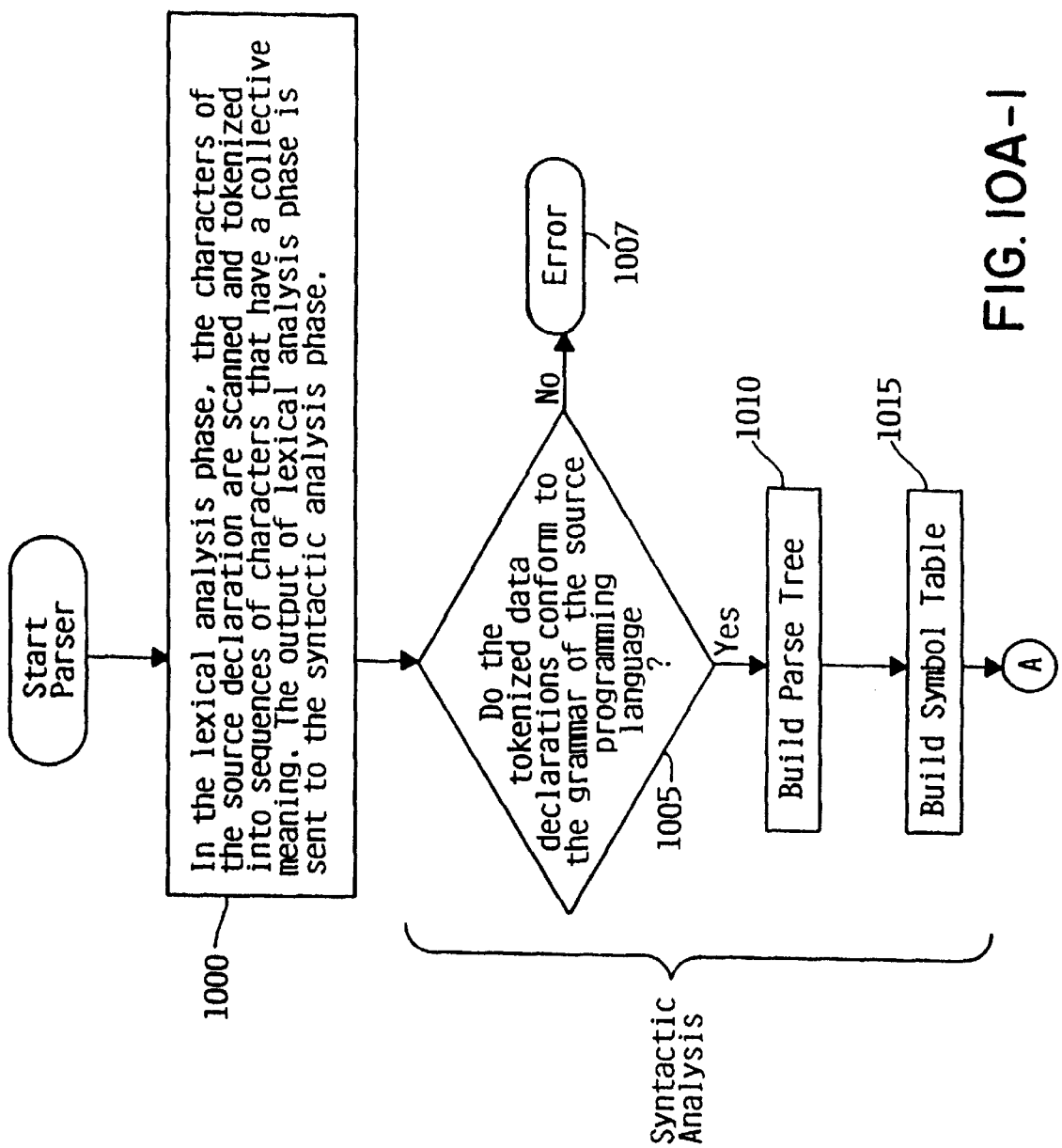
FIG. 10A shows a flow diagram of how a particular program environment's data description is converted into an ADL data description.

FIG. 1 shows a block diagram of the computer systems of the present invention. The computer systems of the preferred embodiment are IBM Personal System/2 Model 80 computers. However, any computer system could be used. Examples of other applicable computer systems include: the IBM AS/400 mid-range computer system and the IBM 3090 mainframe computer system. FIG. 1 shows an exploded view of computer system A, in block 100. Computer system A comprises main or central processing unit (CPU) 110 connected to data storage 130. Storage 130 can be primary memory such as RAM, secondary memory such as a magnetic disk drive, or a combination of different data recording devices. CPU 110 is also connected to user interface 115 and network interface 135. User interface 115 allows developers and users to communicate with computer system A, normally through a programmable workstation. Network interface 135 allows computer system A to utilize the resources of the other computer systems of the preferred embodiment (i.e., computer system B 140 and computer system C 145). Although three computer systems are used in the preferred embodiment, it should be understood that the present invention applies to modern day computer networks which often include anywhere from two to many separate computer systems. In the preferred embodiment, the computer systems are connected via a token ring network; however, any connecting means could be used (e.g., Ethernet, SNA, etc.). Associated with modern day computer networking, are a plethora of resource sharing techniques; examples include: remote file sharing, remote procedure invocation, and message passing.

Data storage 130 contains operating system 127, file system 128, computer programs (shown by program blocks 120) and files (shown by file blocks 125) from various program environments. While storage 130 is shown as a monolithic entity, it should be understood that it may comprise a variety of devices, and that not all programs and files shown will necessarily be contained in any one device. For example, computer programs 120 will typically be loaded into primary memory to execute, while files 125 will typically be stored on magnetic or optical disk storage devices. Additionally, while the operating system 127 is IBM's OS/2 Operating System, any operating system could be used.

Figures 2, 10A:
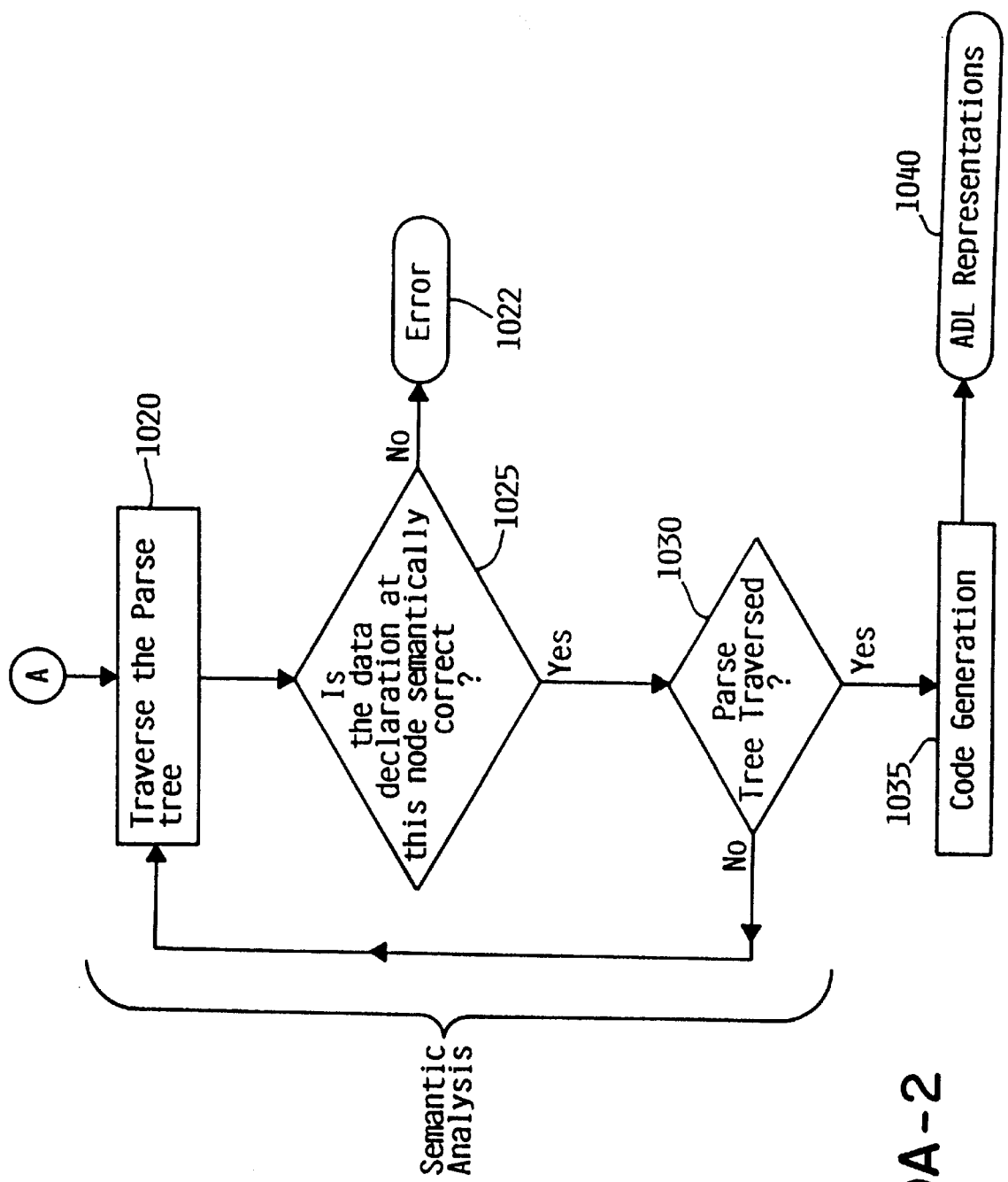

At the center of the ADL design is a data description and conversion module. Throughout this specification, the phrase "data description and conversion module" and the phrase "ADL module" are to be considered interchangeable. FIG. 2, which shows an example of an ADL module, will be used to first point out and explain various ADL constructs and second to describe an example conversion. ADL module 201 includes declaration sections 200 and plan section 250. Contained within ADL declaration sections 200 and plan section 250 are: ADL statements (e.g., DECLARE 220, BEGIN 225, PLAN 255, and assignment statement 275), statement elements (e.g., constant value "10" 236), ADL data types (e.g., BINARY 242, ARRAY OF CHAR 244, and ARRAY OF CHARPRE 249), and data type attributes (e.g., RADIX 243).

As with many programming languages, the ADL language provides for the use of comments 215 and some basic programming statements (e.g., BEGIN and END statements 225, and CONSTANT statement 235). However, the ADL language also includes statements which have specific importance to ADL. Of primary importance are the DECLARE statement (e.g., DECLARE 220) and the PLAN statement (e.g., PLAN 255).

Typical ADL modules include a DECLARE statement for the source program environment (205 in FIG. 2) and a DECLARE statement for the target program environment (210 in FIG. 2). Stated another way, the DECLARE statements delineate the intermediate data descriptions that will ultimately be used to facilitate data sharing between different program environments.

Although most programming languages commonly provide what are known as "declaration statements", ADL DECLARE statements are significant in that they delineate the section of the ADL module which describes how data is represented by the subject program environments. The ADL statements used in the declaration sections are made up of one or more elements. Beyond standard programming language elements such as characters, literals, and conditions, ADL statements include specialized elements which lend themselves to the data sharing task of the ADL language. Examples of such elements are predicate expressions. The syntax of ADL predicate expressions is identical to those of the Structured Query Language (SQL). (Since SQL is well known in the art, its details will not be described further). As with SQL, ADL predicate expressions include comparison predicates, the BETWEEN, IN and LIKE predicates, and Boolean Operators. For a more thorough treatment of these and other ADL statement elements, refer to Chapter 3 of Appendix 1.

Two important ADL statements that are used within the DECLARE statement are the SEQUENCE and CASE statements. SEQUENCE statements are used to group data statements together while CASE statements are used to describe multiformat data.

The ADL SEQUENCE statement is used to group entities of different data types to form compound data types. FIG. 3 is an example of how the SEQUENCE statement of the target DECLARE statement can be used to define a subset of the fields described by the SEQUENCE statement of the source DECLARE statement. FIG. 3 also shows how the SEQUENCE statement of the target DECLARE statement can be used to reorder the fields of the source SEQUENCE statement. Source SEQUENCE statement 300 is used to group fields A 305, B 310, C 315, and D 320 to form compound data type "source.X" 301. Similarly, target SEQUENCE statement 330 is used to group fields D 335, B 340, and A 350, to form compound data type "target.X" 331. When a PLAN statement is used to assign source.X 301 to target.X 331, the fields A, B, and D will be converted into the target program environment and reordered into the order specified by the SEQUENCE statement of the target DECLARE statement. Field C will be ignored. (Plan statements will be described in forthcoming paragraphs)

FIG. 4 shows an example of how the ADL SEQUENCE statement and the ADL CASE statement can be used together within one ADL DECLARE statement. SEQUENCE statement 405 is used to group BINARY data type 410 with the multiformat data elected by CASE statement 415. CASE statement 415 uses the variable A (described as binary by BINARY data type statement 410) to select whether variables C, D, E, or F will be declared. For example, when variable A is equal to 1, then variable C is declared to be of data type CHAR with a length of 4 (i.e., via attribute LENGTH(4)) 420. However, when variable A is equal to 3, variable E is declared to be of data type BINARY with a length of 3 (i.e., via attribute LENGTH(3)) 440. When A is not equal to 1, 2, or 3, variable F is declared to be of data type ASIS with a length of 4 (i.e., via attribute LENGTH (4)) 450.

To understand how the declarations of FIG. 4 could be used in practice, assume that a PLAN statement is used to assign source.X to target.X. (The PLAN statement and data type attributes will be discussed in greater detail in forthcoming paragraphs). The example shown by FIG. 4 is particularly applicable to the conversion of multiformat files. A multiformat file is one which contains more than one record format. The order and frequency of these records is unpredictable, but each record has a discriminant field that serves to identify its format. Source.X.A is an example of a discriminant field. Since multiformat files and discriminant fields are well known in the art, their details will not be described further. Returning to FIG. 4, the assignment of source.X to target.X will cause source.X.A to be compared to the constants 1, 2, 3 specified in source CASE statement 415. If, for example, source.X.A has a value of 1, then when statement B1 of CASE source.X.B is selected as the description of the data following source.X.A. In this case, the data described is variable source.X.B.C, a CHAR of length 4. When source.X is assigned to target.X, CASE target.X.B is searched for a WHEN statement that also has an identifier of B1. This, then, yields a declaration of target.X.B.C, a CHARPRE field of length 4. Then, the data of source.X.B.C is assigned to target.X.B.C with conversion from the CHAR data type to the CHARPRE data type. Once the conversion is complete, the discriminator field represented by target.X.A is evaluated to ensure that the target discriminator selects the correct declarations. In this example, ADL requires that when discriminator field target.X.A is equal to 1, variable target.X.C is described as being of type CHARPRE.

A WHEN clause may also be used outside of a CASE statement in a data declaration statement. The predicate expression of the WHEN clause is evaluated whenever data is assigned to the declared variable. If the predicate evaluates to FALSE, the conversion is terminated. This capability is in place for two reasons. First, the conversion program that is created using the subject WHEN clause can be used as a filter. That is, only data that satisfies the criteria of the WHEN clause(s) of the target declaration is actually converted and made available to the requesting computer program. The second reason for this capability is to validate data as it is being written to a file. In other words, only data that meets the criteria of the WHEN clause(s) in the target declaration is actually converted and written to the file.

FIG. 5 shows a conversion grid of the ADL data types. These data types are used within the declaration section of the ADL module to describe how the data of the subject program environments is represented on a particular computer system. The data types that are included in the source DECLARE statement describe how data is represented in the source program environment while the data types of the target DECLARE statement describe how data is represented in the target program environment. An "X" on the grid diagram of FIG. 5 indicates that the conversion between the particular data types is supported while the absence of an "X" indicates that conversion between the data types is not supported. For example, the grid shows that the ADL PACKED data type can be converted to any of the following ADL data types: ASIS, BINARY, ENUMERATION, FLOAT, PACKED, and ZONED. In contrast, the absence of an "X" shows that the ADL PACKED data type cannot be converted to the ADL BIT, BITPRE, BOOLEAN, CASE, -CHAR, CHARPRE, CHARSFX, and SEQUENCE data types. It should be understood that while some conversions were not supported in the preferred embodiment, these choices do not restrict the capability of the ADL system. For a more thorough treatment of the ADL data types, refer to Chapter 5 of Appendix 1. For a discussion of the data conversions allowed by ADL, see Chapter 8 of Appendix 1.

Since the purpose of the ADL language is to facilitate the creation of conversion programs, the ADL data types are designed to accommodate the data types of a broad spectrum of programming languages as implemented on a variety of computer systems. To accomplish this, each ADL data type is generalized by a set of attributes. For example, the ADL BINARY type has attributes that allow binary encodings of numbers to be: signed or unsigned, real or complex, byte reversed, scaled to base 2 or base 10, or range constrained. In FIG. 2, the BINARY data type of the source program environment's var_1 has been defined to be of base 10 through use of RADIX attribute 243. It is also important to note that not all ADL data types and not all the attributes of any one ADL data type are required for all program environments. For a more thorough treatment of the attributes which modify ADL data types, refer to Chapter 6 of Appendix 1.

ADL PLAN statements are used in ADL to delineate the section of the ADL module which instructs the computer system to perform a particular data conversion or series of data conversions. In FIG. 2, PLAN statement 255 delineates other ADL statements which instruct the computer system to convert the way in which data is represented in the source type domain (as described by DECLARE statement 220) to the way in which data is represented in the target type domain (as described by DECLARE statement 245). Although the ADL module of FIG. 2 shows only plan section 250, ADL modules often contain multiple plan sections.

In addition to the PLAN statement, the ADL plan section can include: a parameter list, one or more assignment statements, and one or more CALL statements. The PLAN statement defines the calling interface of the plan. The name specified for each parameter must be the name of a variable declared in one of the declaration sections of the ADL module. For INPUT parameters (e.g., INPUT 260 on FIG. 2.), the data passed by the calling computer program to the plan is assumed to be represented as described by the named declaration (e.g., 257 on FIG. 2). Similarly, OUTPUT parameters (e.g., OUTPUT 264 on FIG. 2) expect that the data which is to be returned to the calling computer program is represented as described by the named declaration (e.g., 262 on FIG. 2).

The ADL CALL statement is used to invoke other computer programs. Generally, ADL CALL statements are used for two purposes. First, ADL CALL statements can be used to perform conversions not otherwise available through ADL. For example, if it is necessary to perform a non-supported conversion (i.e., ADL CHAR to ADL BINARY), a special purpose computer program can be written and called directly from the ADL conversion program. The second use of ADL CALL statements is to allow otherwise incompatible computer programs to invoke one another's procedures. Under this scenario, an ADL conversion program is acting as an intermediary between the two incompatible computer programs. The conversion program first performs any necessary conversions of input parameters. Once this is accomplished, the conversion routine calls the appropriate procedure using the converted input parameters. When the invoked procedure returns, the conversion program converts the return parameters back into the form understood by the calling computer program. For a more thorough treatment of these and other ADL statements, refer to Chapter 4 of Appendix 1.

Taken as a whole, ADL module 201 of FIG. 2, represents an "un-compiled" conversion program. The representation of the source program environment data (described by SEQUENCE statement 240) is to be converted to the form of the target program environment data (described by SEQUENCE statement 247). Using the conversion grid of FIG. 5, it can be seen that the conversion between the BINARY data type of the source program environment's var_1 to the BINARY data type of the target program environment's var_1 is supported by ADL. Similarly, the conversion between the CHAR data type of the source program environment's var_2 array to the CHARPRE data type of the target program environment's var_2 array is also supported by ADL. Using assignment statement 275 of plan section 250, the internal form of Source.structure_A is converted to the internal form of Target.structure_A. In operation, this would be accomplished by invoking plan Read 270 and supplying the correct arguments (i.e., an actual structure having the form of Source.structure_A and an actual location for Target.structure_A).

Figure 1A:
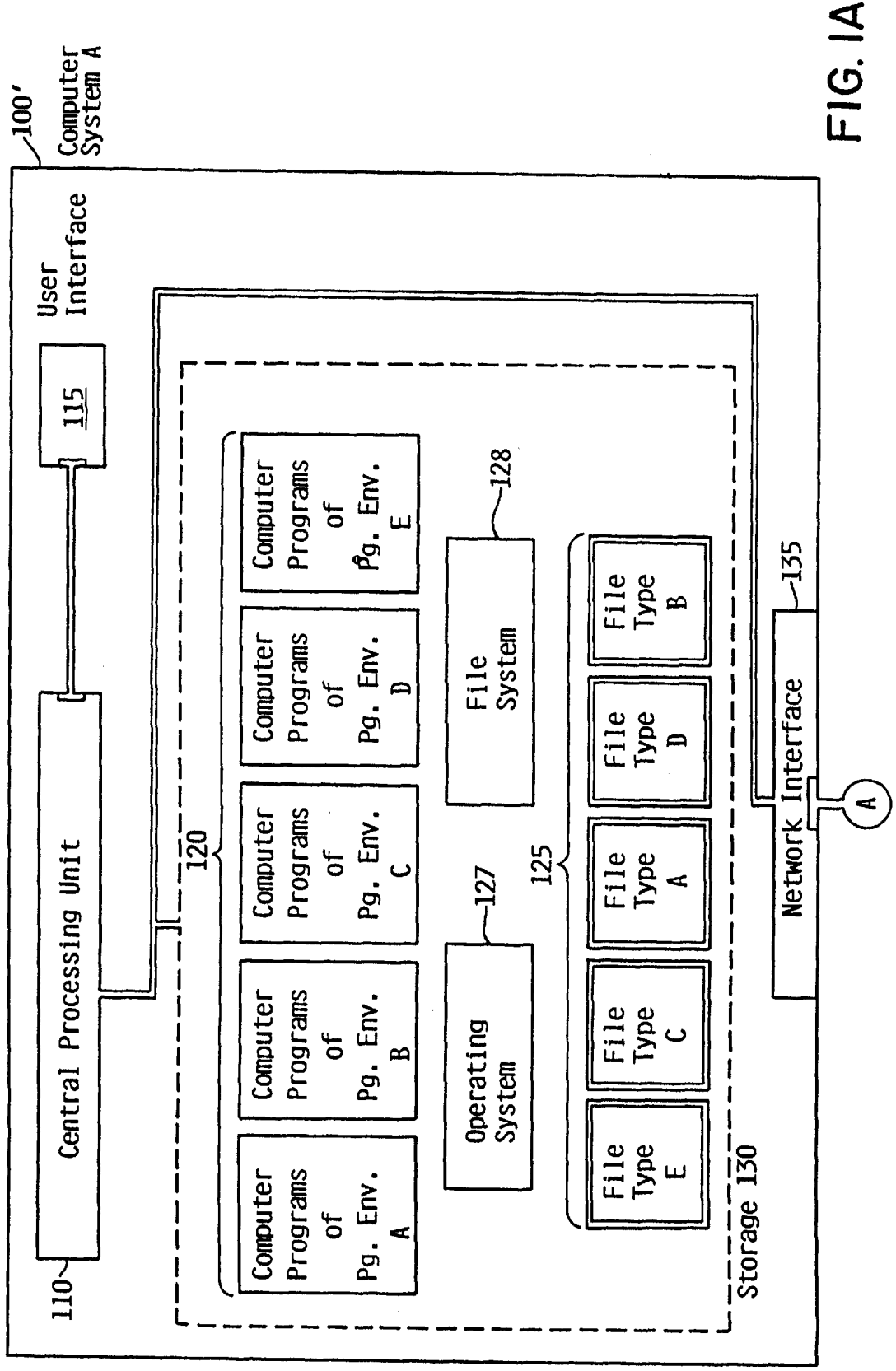
FIGS. 1A and 1B shows the computer systems of the invention.
Figure 1B:
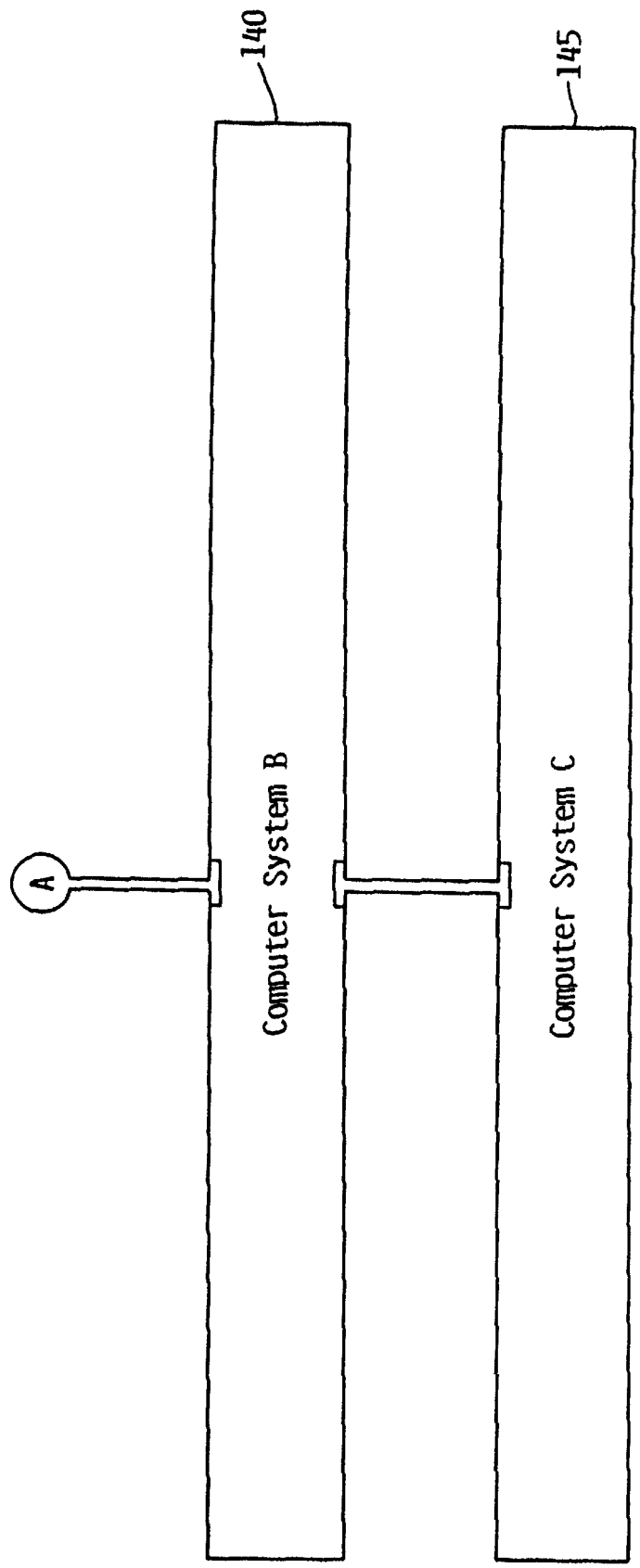
Figure 2B:
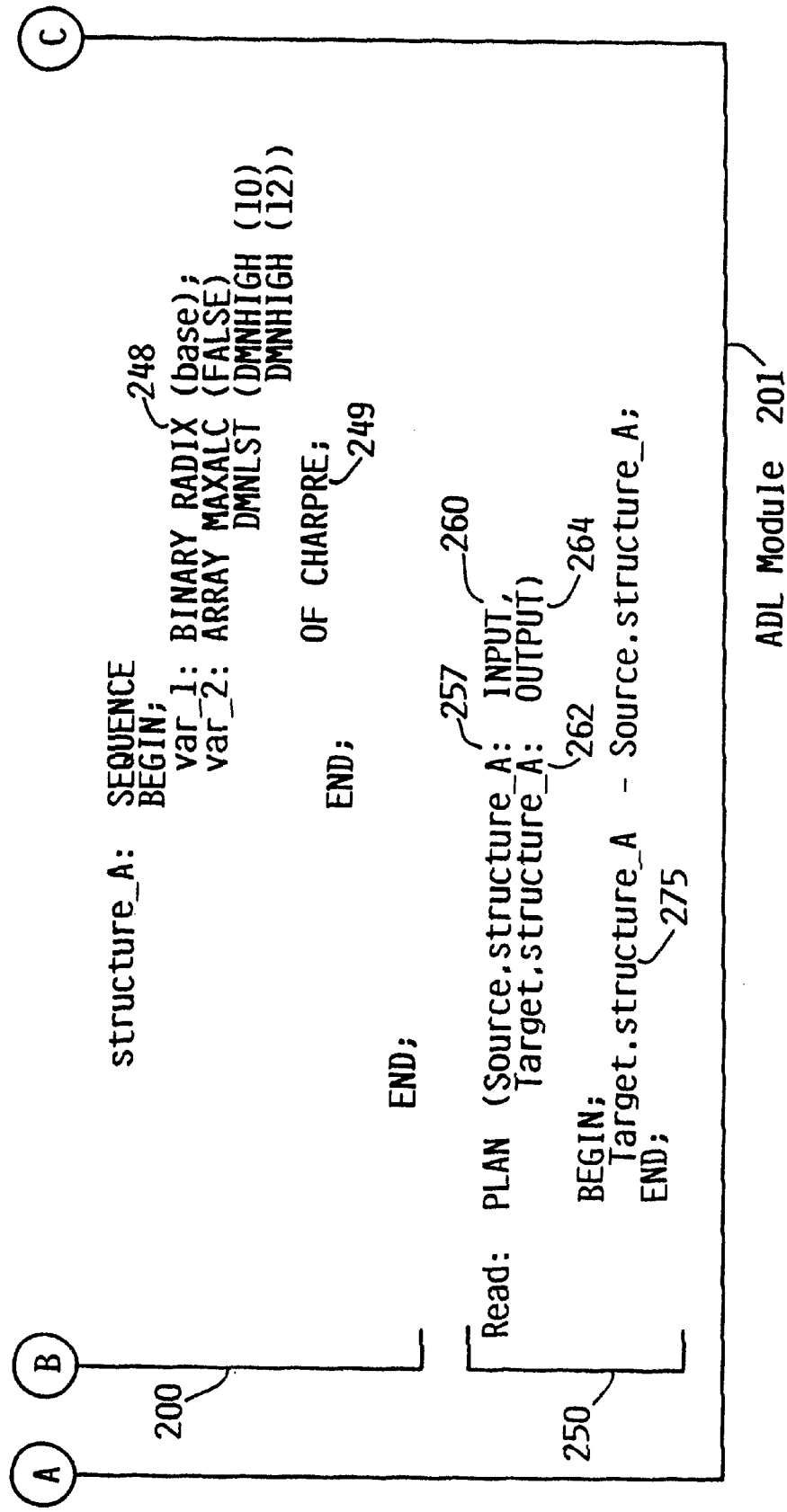
Figure 6:
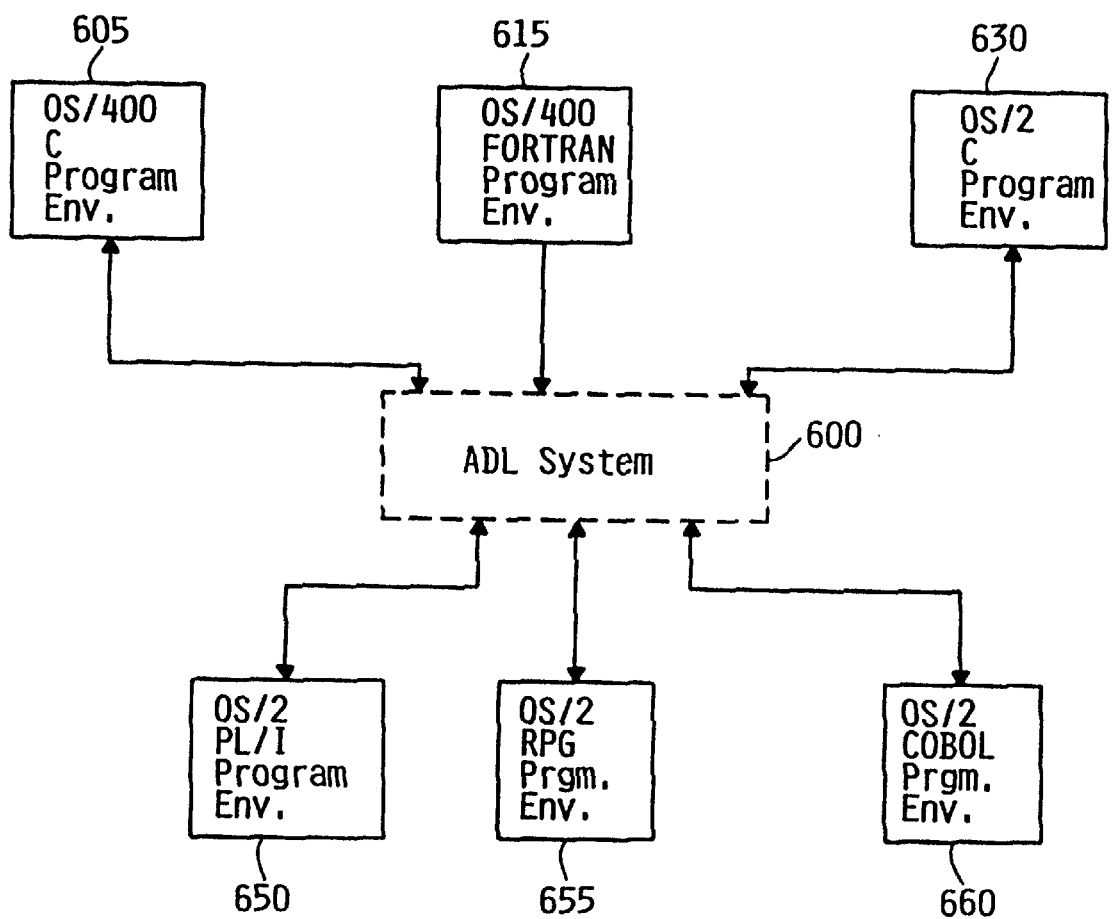
FIG. 6 shows an example of how the ADL system plays the role of an intermediary between program environments.

FIG. 6 shows an example high level flow diagram of how ADL system 600 plays the role of an intermediary by allowing different program environments to share data.

Program environments 605, 615, 630, 650, 655, and 660 can all use ADL system 600 to share data amongst one another. For example, OS/2 C program environment 630 can use ADL system 600 to share data stored or created with OS/2 COBOL program environment 660. Similarly, OS/400 DOCKET NO. R0991-076 FORTRAN program environment 615 can use ADL system 600 to share data stored or created within OS/2 PL/I program environment 650.

Figure 7:
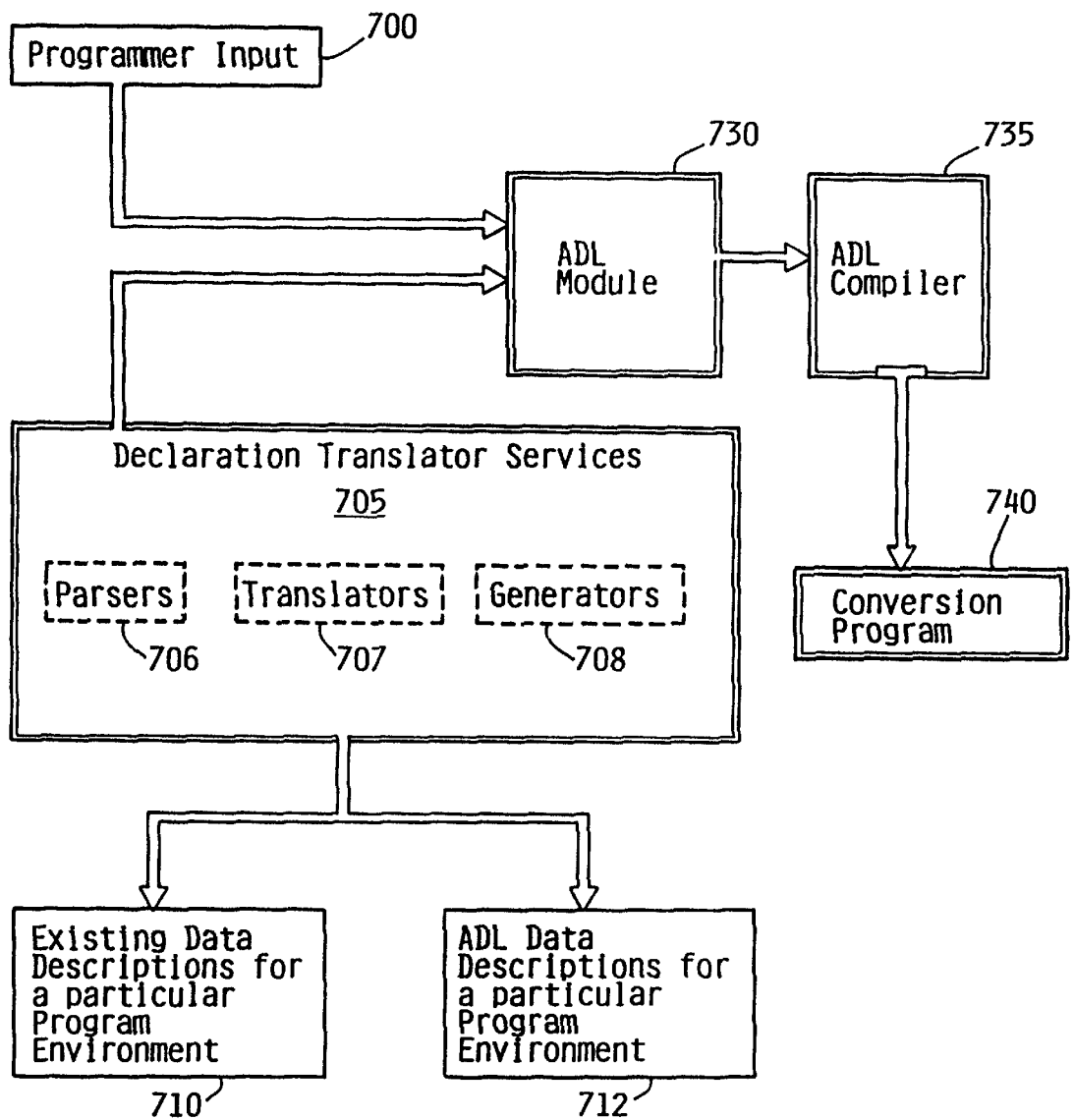
FIG. 7 shows the process by which an ADL conversion program is created.

FIG. 7 shows an exploded view of ADL system 600. ADL module 730 may be created manually through programmer input 700 or automatically through declaration translator services 705. Declaration translator services is described in greater detail in the discussion associated with FIGS. 8 through 10C. Since ADL provides user friendly statements, data types, and elements that can be mastered by those skilled in the computer programming art, a computer programmer can manually write an ADL module to perform the requisite conversion. However, it may in some circumstances be less effort to create ADL module 730 from existing data description 710. For this reason, ADL provides declaration translator services 705. Declaration translator services 705 comprises parsers 706, translators 707, and generators 708. Parsers 706 are used to create an ADL data description from the data descriptions of a particular program environment (e.g., an OS/2 C program environment). Translators 707 are used to translate an ADL description for a different program environment (e.g., an OS/2 COBOL program environment) into an ADL description of the required program environment (e.g. an OS/2 C program environment). Generators 708 are used to generate a data description for a particular program environment (e.g. an OS/2 C program environment) from an existing ADL data description.

Once ADL module 730 has been created by either programmer input 700 or declaration translator 705, it is compiled by ADL compiler 735 into executable conversion program 740. The design of ADL compiler 735 is dependent upon the computer system involved. For a thorough treatment of the ADL syntax necessary to construct an appropriate ADL compiler, refer to the document incorporated as Appendix 1.

Figure 8A:
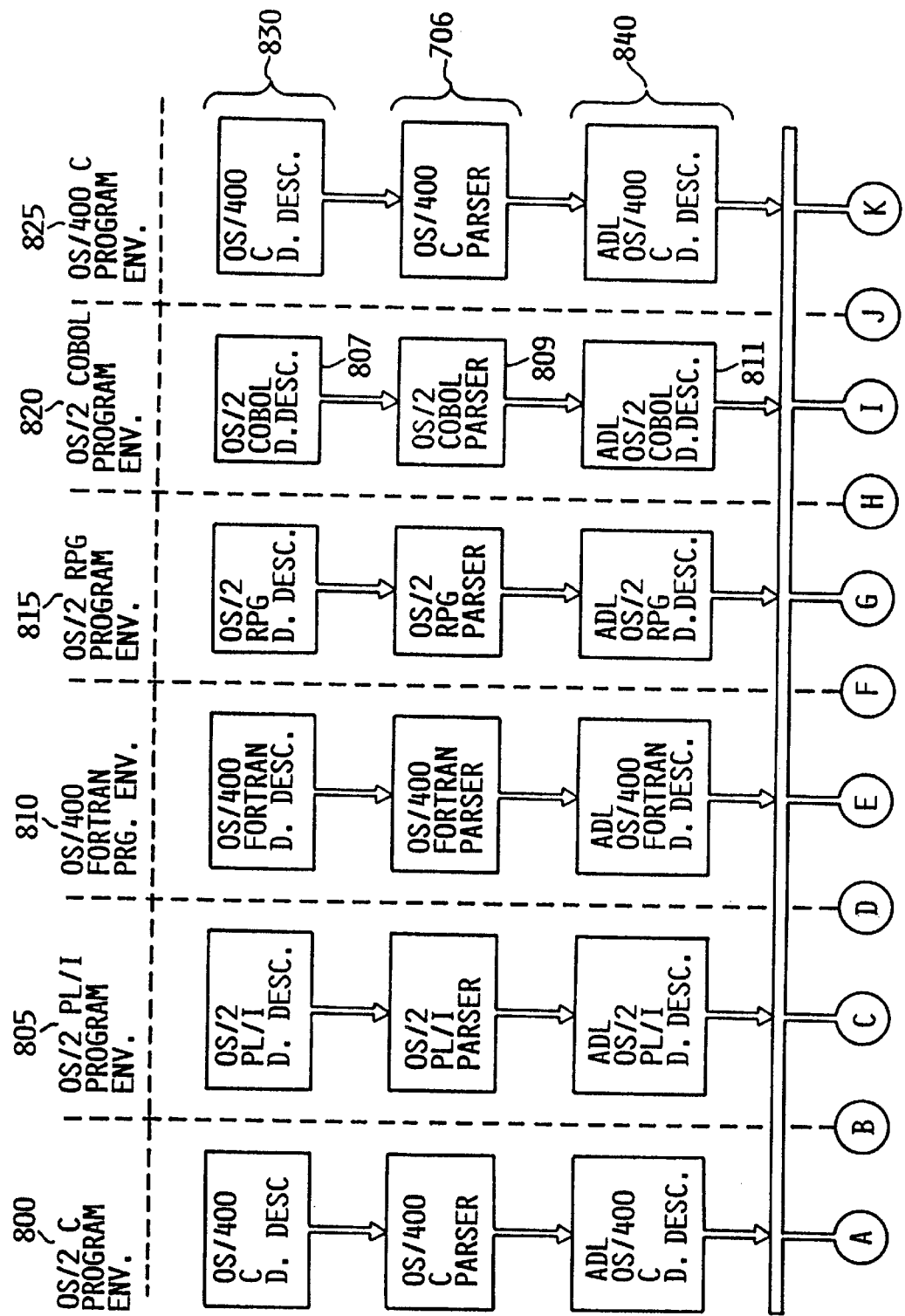
FIGS. 8A and 8B shows the interaction of various declaration translators.
Figure 8B:
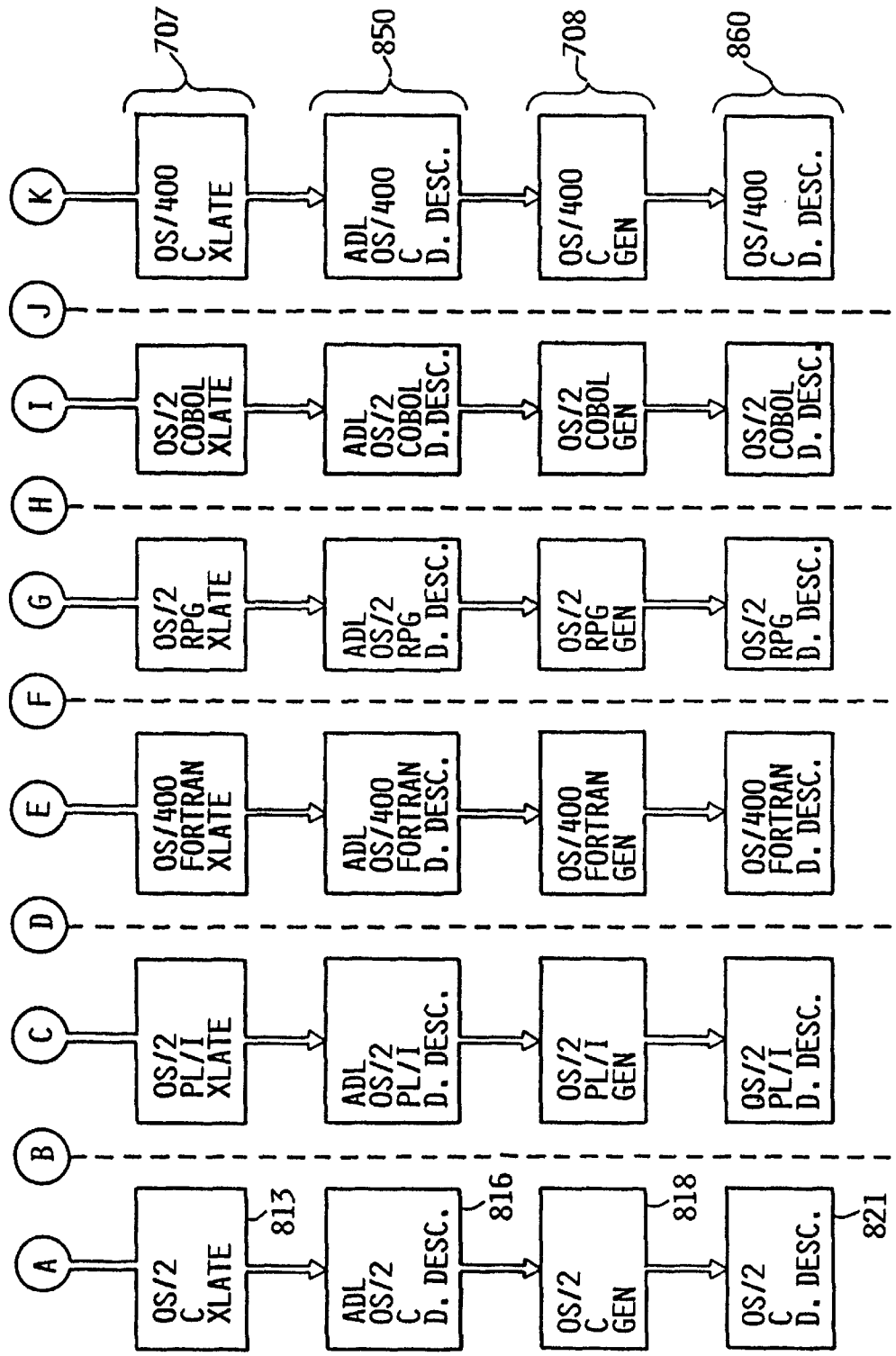

FIG. 7 shows that declaration translator services 705 is made up of parsers 706, translators 707, and generators 708. In operation, a parser, translator, and generator exist for each program environment. In other words, parsers 706, translators 707, and generators 708 of declaration translator services 705 are partitioned into individual declaration translators. FIG. 8 shows how declaration translators interact within declaration translator services 705.

Each declaration translator supports a particular program environment. Examples of program environments which could be supported in the ADL system of the preferred embodiment are shown as columns in FIG. 8. From left to right the following program environments are shown: 800 (OS/400 C), 805 (OS/2 PL/I), 810 (OS/400 FORTRAN), 815 (OS/2 RPG), 820 (OS/2 COBOL), and 825 (OS/400 C). Also shown in row form on FIG. 8 are parsers 706, translators 707, and generators 708.

Parsers 706 are used to create the intermediate data descriptions (shown as row 840) from native data descriptions (shown as row 830). (The word "native," when used to describe a data description, should be understood to mean the normal manner with which data is described by the language of the subject program environment.) Translators 707 form the bridge between the subject program environments. Once an intermediate data description is created for one program environment, translators 707 can be used to translate it into an intermediate data description for another program environment (shown as row 850). To complete the cycle, generators 708 can be used to generate native data descriptions (860 or 830) from an intermediate data description. It is important to note that while generators 708 are shown to operate on intermediate data descriptions 850, generators 708 can only operate on intermediate data description, appropriate to their own program environment, including those shown by row 840.

For an example of how the declaration translators of declaration translator services 705 would operate in practice, consider the need to share data between OS/2 COBOL program environment 820 and OS/2 C program environment 800. Native OS/2 COBOL data description 807 is first parsed by OS/2 COBOL parser 809 to create ADL OS/2 COBOL data description 811. ADL OS/2 COBOL data description 811 could then be used as the source data description by ADL system 600. The translator for the OS/2 C program environment (i.e. translator 813) then translates data description 811 into a target data description (shown as ADL OS/2 C data description 816). If necessary, OS/2 C generator 818 could be used to generate native OS/2 C data description 821 from intermediate ADL OS/2 C data description 816.

Figure 9A:
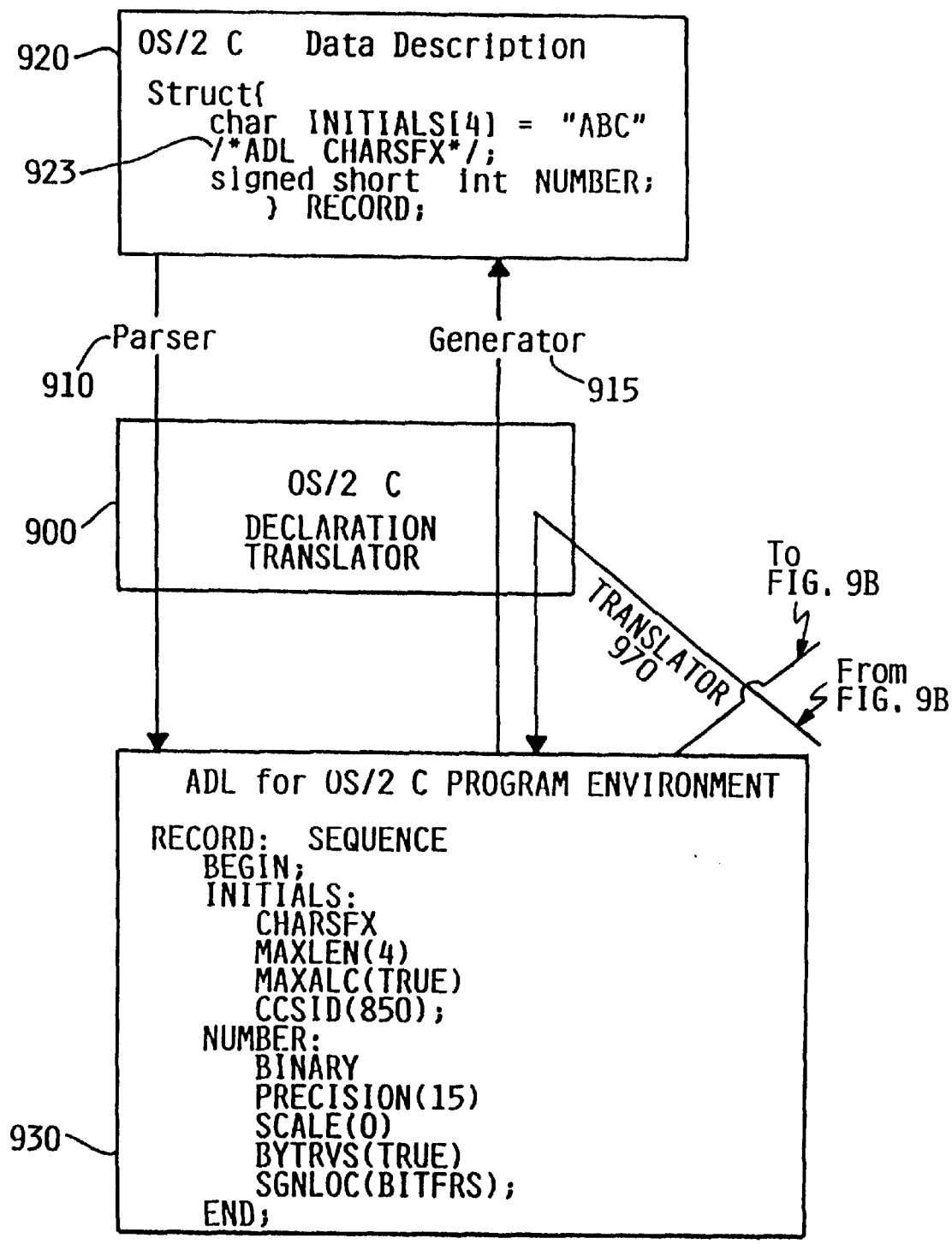
FIGS. 9A and 9B shows how ADL declaration translators interact with data descriptions.
Figure 9B:
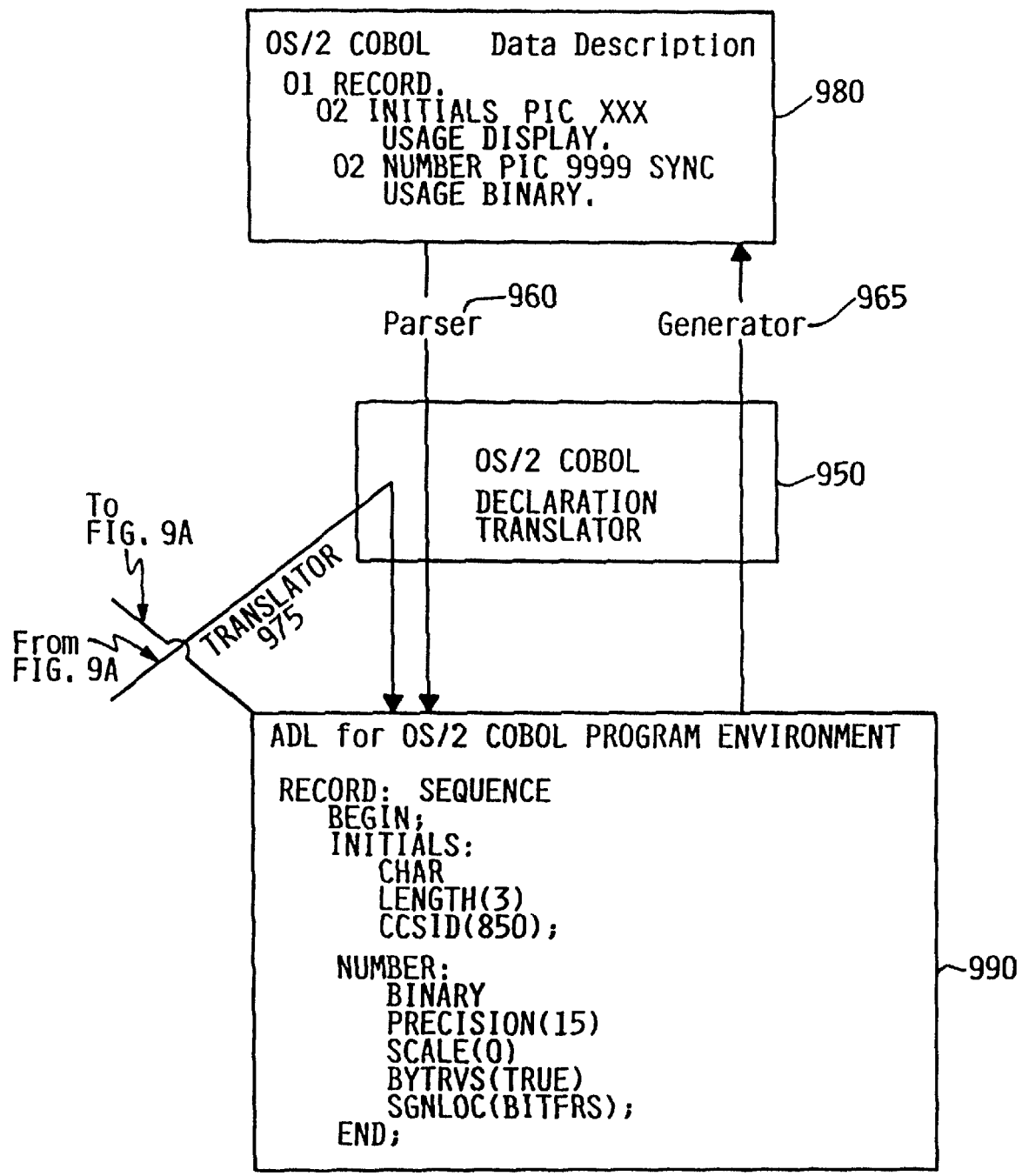

FIG. 9 expands upon this last example to show how individual declaration translators are used to create ADL modules, and eventually, conversion programs. Each declaration translator understands the following things about its programming environment: the syntax of the programming language used by programmers for describing data, the data types supported by the programming language, the attributes of the programming language used to qualify the data types, the representations used by the compiler for each data type, the method used by the compiler for aligning data in memory, and the methods used by the compiler for mapping constructor types to memory.

OS/2 C declaration translator 900 and OS/2 COBOL declaration translator 950 are used to manipulate data descriptions 920, 930, 980, and 990. Parser 910 of OS/2 declaration translator 900 is used to parse native OS/2 C data description 920 to create intermediate ADL OS/2 C data description 930. ADL OS/2 C data description 930 could then be used as a source or target description within an ADL module. Similarly, parser 960 is used to parse OS/2 COBOL data description 980 to create ADL OS/2 COBOL data description 990. ADL OS/2 COBOL data description 990 could likewise be used as a source or target description within an ADL module.

Since declaration translators 900 and 950 each contain a translator (970 and 975), ADL OS/2 C data description 930 can be translated into ADL OS/2 COBOL data description 990 and vise versa. As before, either ADL data description (i.e., 930 and 990) can then be used as a source or target description within an ADL module.

Generators 915 and 965 are used to create native data descriptions 920 and 980 from ADL data descriptions 930 and 990. This capability is valuable in that it allows programmers to make changes to ADL modules using the programming language with which they are most familiar. Once the programmer uses his or her preferred programming language to make the requisite change, a parser can be used to parse the data description back into an ADL data description. For example, assume that ADL OS/2 C data description 930 is a source data description from an ADL module. A programmer who is familiar with the C programming language could use Generator 915 to create OS/2 C data description 920. Since our hypothetical programmer is familiar with the C programming language, he or she can then make any necessary changes to OS/2 C data description 920 directly. Once the changes have been made, the programmer can use parser 910 to parse C data description 920 back into ADL OS/2 C data description 930.

FIG. 10A shows the operation of parsers 710 and 760 in greater detail. The operation is similar to that involved in the construction of a high level language compiler. Parsers 710 and 760 read the data declarations in the syntax of the program environment's programming language and group them into sequences of characters that have a collective meaning (i.e., lexically analyze) 1000. The groups, or tokens, are fed into the syntactic analysis part of the operation 1005. This component analyzes the syntactic structure of the source data declarations to ensure that it conforms to the grammar of the programming language. If the data declarations are grammatically incorrect, an error condition is signalled 1007. During syntactic analysis operation, parse trees which are "tree form" representations of the source data declarations are built 1010. In addition to the parse trees, symbol tables of identifiers are constructed. Included within the symbol tables are attributes used in the source data declarations 1015. The result of the syntactic analysis operation is fed into the semantic analysis phase of the operation 1020. This phase involves semantic actions associated with each node of the parse trees generated 1025. This is done to ensure that the source data declarations are semantically correct. If the declarations are not semantically correct, an error condition is signalled. When the parse tree has been completely traversed 1030, the ADL data descriptions that correspond to the source data descriptions are generated 1035.

Figure 10B:
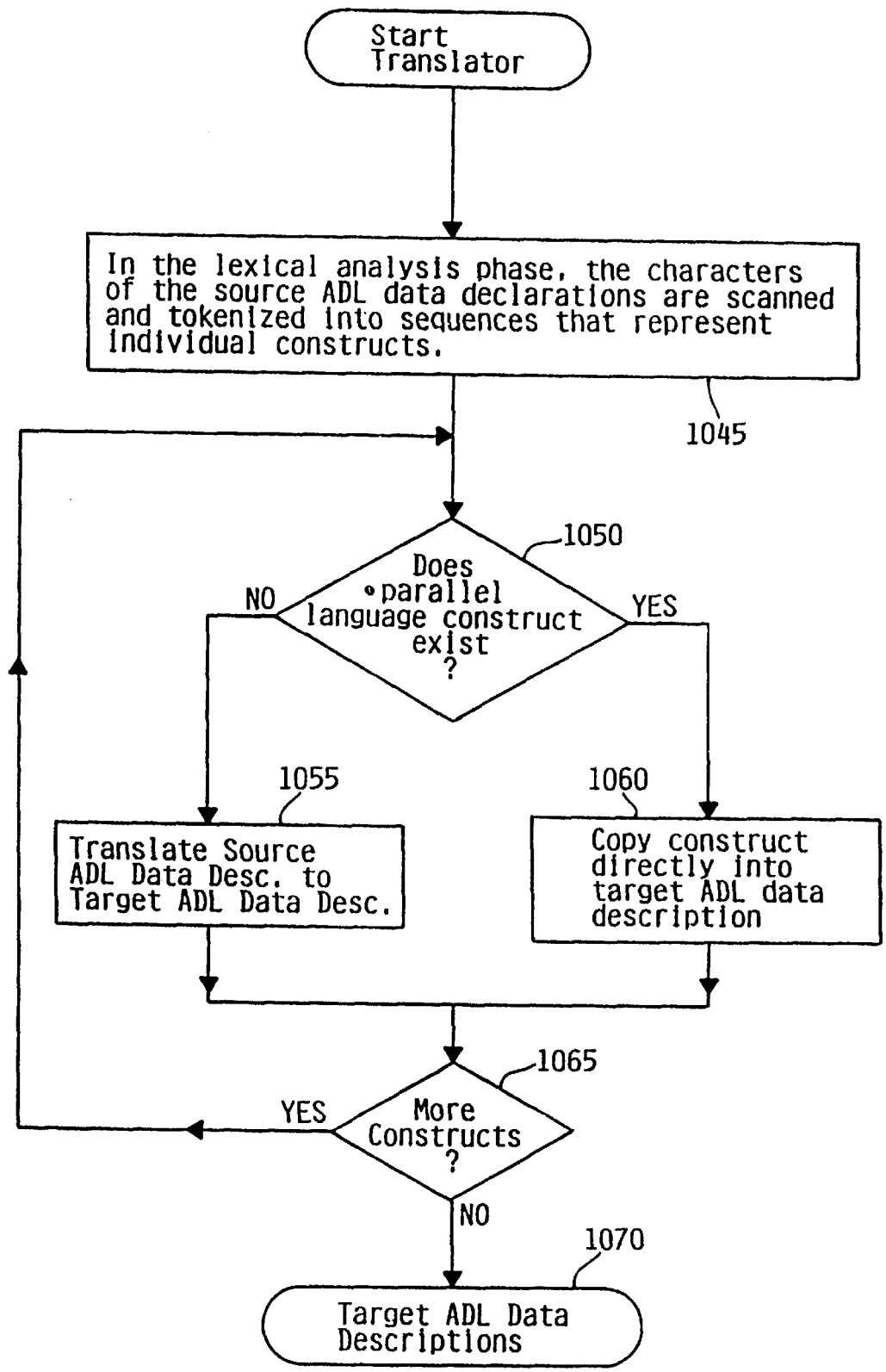
FIG. 10B shows a flow diagram of how an ADL data description for one program environment is translated into an ADL data description for another program environment.

FIG. 10B shows the operation of translator 770 in greater detail. Translator 770 first reads and tokenizes the data descriptions in ADL syntax. The translator then analyzes the ADL syntax to determine the structure of the source ADL data descriptions 1045. The operation starts at the highest level structure and continues to lower level constructs. For each structure identified, the translator determines whether a parallel language construct exists within the target declaration translator's programming environment (i.e., whether the language construct is supported in the target declaration translator's programming environment) 1050. If a parallel language construct does exist, no translation of the structure is required. The structure is copied directly into the target ADL descriptions 1060. If the language construct is non-parallel (i.e., not supported in the target declaration translator's programming environment), the structure is translated into the most comparable language construct that is supported by the target declaration translator 1055. For example, this translation would occur when a singular, nonparallel language construct can be translated into a composite language construct. This process continues until the lowest level of the source data descriptions (i.e., field level descriptions) are analyzed and their data types and attributes are either copied or translated 1065. When all of the source ADL declarations are processed, the translation is complete 1070.

Figures 1, 10C:
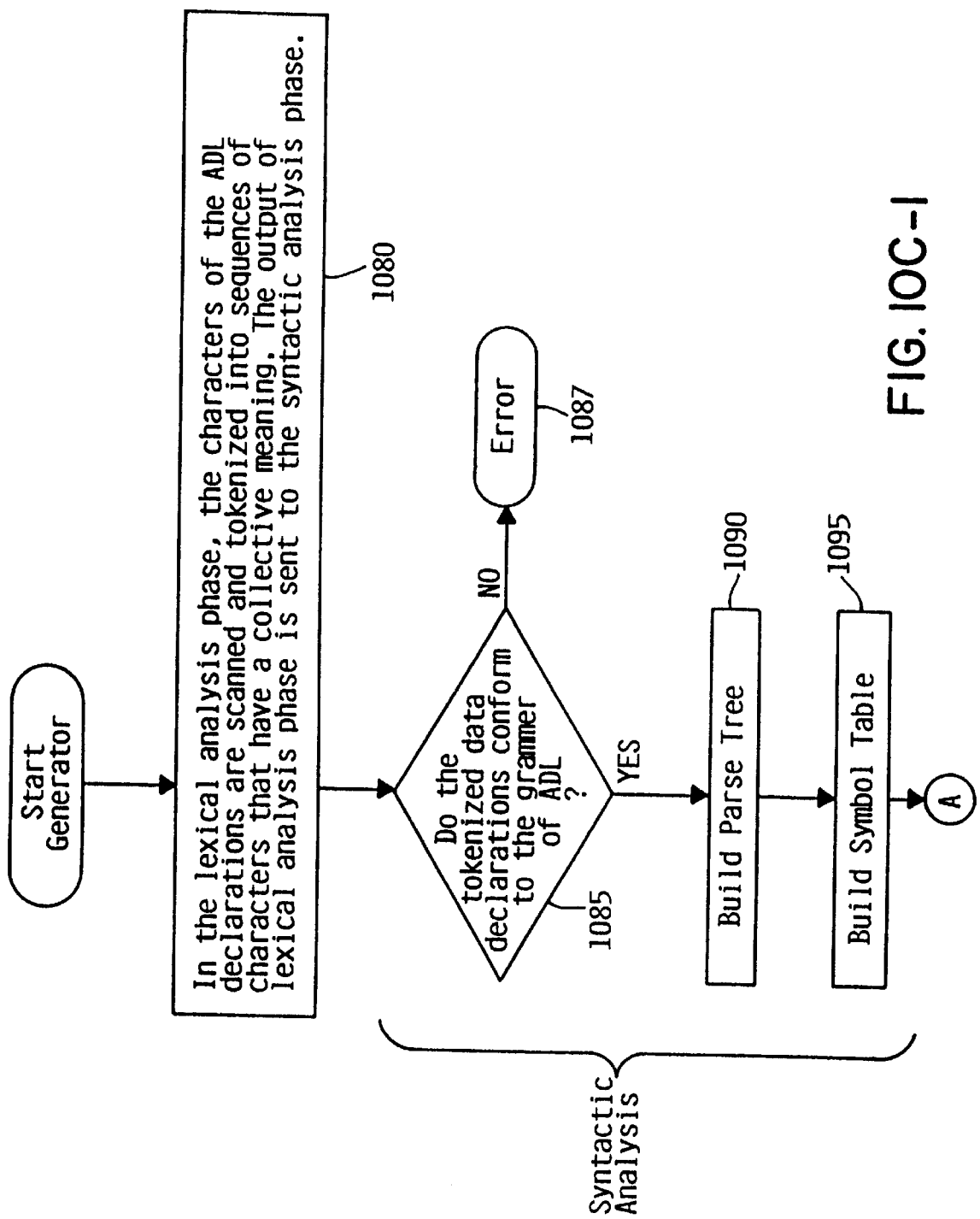
FIG. 10C shows a flow diagram of how an ADL data description for a particular program environment is converted back into that program environment's own data description.
Figures 2, 10C:
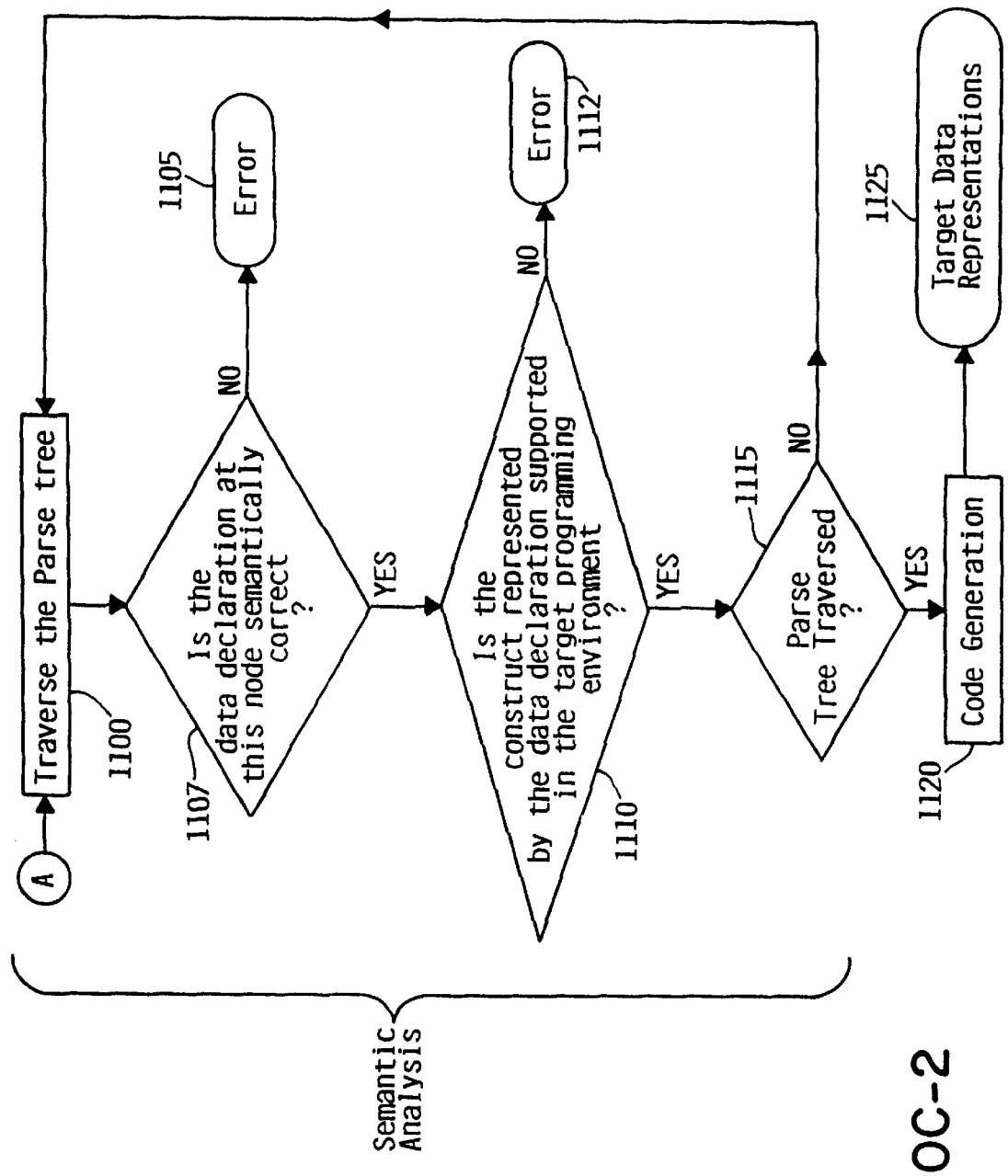

FIG. 10C shows the operation of generators 715 and 765 in greater detail. The operation is conceptually inverse to the operation of the parsers 710 and 760. Parsers 710 and 760 map programming language descriptions into ADL data descriptions while generators 715 and 765 map ADL data descriptions into programming language data descriptions. Generators 715 and 765 read the data descriptions in ADL syntax and group them into sequences of characters that have a collective meaning (i.e., lexically analyze) 1080. The groups, or tokens, are fed into the syntactic analysis part of the operation 1085. This component analyzes the syntactic structure of the source data declarations to ensure that it conforms to the ADL grammar. If the data declarations are grammatically incorrect, an error condition is signalled 1087. During syntactic analysis operation, parse trees which are "tree form" representations of the source data declarations are built 1090. In addition to the parse trees, symbol tables of identifiers are constructed. Included within the symbol tables are attributes used in the source data declarations 1095. The result of the syntactic analysis operation is fed into the semantic analysis phase of the operation 1100. This phase involves semantic actions associated with each node of the parse trees generated 1107. This is done to ensure that the ADL data declarations are semantically correct. If the ADL data declarations are not semantically correct, an error condition is signalled 1105. Next, generators 715 and 765 determine whether the subject construct is supported in the target programming environment 1110. If the construct is not supported, an error condition is signalled 1112. When the parse tree has been completely traversed 1115, the ADL data descriptions that correspond to the source data descriptions are generated 1120.

For examples of declaration translators, refer to the declaration translator document for the OS/2 C declaration translator which is included as Appendix 2 and incorporated herein. This document was unpublished as of the filing date of the patent application.

As seen at 923 on FIG. 9, data descriptions can be annotated to include information intended for the ADL compiler. This capability is important in that it allows a programmer to augment the power of a particular programming language. A programmer may wish to add an information field to a record (e.g,. a title) or a programmer may wish to override a conversion normally provided by ADL. For more information regarding ADL annotation, refer to the document "Data Description and Conversion Architecture" which is included as Appendix 3 and incorporated herein.

One of the best examples of the power of ADL and the ADL declaration translators is the ability to access data stored by computer programs from different program environments. To access data stored in different program environments, ADL conversion programs can be created on an as needed basis. In the preferred embodiment, however, ADL is incorporated into file system 128 of FIG. 1. Whenever a file is created, file system 128 creates an ADL description of how data is represented in the original program environment by using the parser included in the original program environment's declaration translator. This ADL description becomes the source ADL data description. File system 128 then appends the source ADL data description to the file itself.

When a computer program from a second program environment wishes to access the data stored by the original program environment, file system 128 will first use the translator of the second program environment's declaration translator to create an ADL data description of how the data will be represented in the second program environment. This ADL description becomes the target ADL data description. File system 128 will then combine the two ADL data descriptions with default plans. File system 128 then submits this combination of ADL descriptions and plans (i.e., the ADL module) to an ADL compiler. The result of the compilation is an ADL conversion program which allows a computer program from the second program environment to access data stored by a computer program from the original program environment.

Beyond the use of ADL conversion programs to access data stored by computer programs from different programming environments, ADL conversion programs can be used to exchange messages between computer programs from different program environments, invoke the procedures of a computer program which exists in a different program environment, and invoke the procedures of a computer program which exists in a different program environment and on a different computer system. For a detailed treatment of the various uses of ADL and the ADL declaration translators, refer to Appendix A of the attached Appendix 1.

Although a specific embodiment of the invention has been disclosed, it will be recognized by those skilled in the art that additional variations in form and detail may be made within the scope of the following claims.

What is claimed is:

1. A computer system having a first program environment and a second program environment, said system comprising:
   a creating mechanism, said creating mechanism comprising means for creating a data description and conversion module, said data description and conversion module comprising first program environment data describing means and second program environment data describing means and means for converting data described by said second program environment data describing means into data described by said first program environment data describing means;
   a compiler, said compiler comprising means for compiling said data description and conversion module to create an executable conversion program; and
   an invoking mechanism, said invoking mechanism comprising means for invoking said executable conversion program, said executable conversion program being invoked by a first program from said first program environment to share data stored by a second program from said second program environment.

2. The computer system of claim 1 wherein said invoking mechanism further comprises means for said first program to call procedures of said second program.

3. The computer system of claim 1 wherein said invoking mechanism further comprises means for said first program to call procedures of said second program, said first program residing on a first computer system and said second program residing on a second computer system.

4. The computer system of claim 1 wherein said invoking mechanism further comprises means for said first program to send messages to said second program.

5. The computer system of claim 1 wherein said invoking mechanism further comprises means for said first program to send messages to said second program, said first program residing on a first computer system and said second program residing on a second computer system.

6. The computer system of claim 3 wherein said invoking mechanism further comprises means for said first program to obtain data stored by said second program.

7. The computer system of claim 1 wherein said invoking mechanism further comprises means for said first program to obtain data stored by said second program, said first program residing on a first computer system and said second program residing on a second computer system.

8. The computer system of claim 1 wherein said means for comprises:
   a parsing mechanism for parsing data descriptions from a particular program environment into source DL data descriptions, and
   a translating mechanism for translating said source ADL data descriptions into target data descriptions, said source data descriptions being ADL data descriptions for a program environment different from said particular program environment.

9. A method for sharing data between computer programs in first and second program environments, said method comprising the machine executed steps of:
   creating a data description and conversion module, said data description and conversion module comprising first program environment data descriptions and second program environment data descriptions and means for converting data described by said second program environment data descriptions into data described by said first program environment data descriptions;
   compiling said data description and conversion module into a conversion program; and
   executing said conversion program to allow a first computer program from said first program environment to share data with a second computer program from said second program environment.

10. The method of claim 9 wherein said executing step comprises the machine executed step of said first program calling procedures of said second program.

11. The method of claim 9 wherein said executing step comprises the machine executed step of said first program calling procedures of said second program, said first program residing on a first computer system and said second program residing on a second computer system.

12. The method of claim 9 wherein said executing step comprises the machine executed step of said first program sending messages to said second program.

13. The method of claim 9 wherein said executing step comprises the machine executed step of said first program sending messages to said second program, said first program residing on a first computer system and said second program residing on a second computer system.

14. The method of claim 9 wherein said executing step comprises the machine executed step of said first program obtaining data stored by said second program.

15. The method of claim 9 wherein said executing step comprises the machine executed step of said first program obtaining data stored by said second program, said first program residing on a first computer system and said second program residing on a second computer system.

16. An apparatus for translating data descriptions, said apparatus comprising:
   a reading mechanism for reading an intermediate data description;
   a grouping mechanism for grouping said first intermediate data description into sequences of characters that represent individual constructs;
   a copying mechanism for copying a first subset of said individual constructs, said first subset of said individual constructs being parallel language constructs;
   a translator for translating a second subset of said individual constructs into most comparable language constructs; and
   a generator for generating a second intermediate data description from said parallel language constructs and said comparable language constructs.

17. An apparatus for generating a data description, said apparatus comprising:
   a reading mechanism for reading an intermediate data description;
   a grouping mechanism for grouping said intermediate data description into sequences of characters that have a collective meaning, said sequences being tokenized data declarations;

an analyzer for analyzing said tokenized data declarations to ensure that they are grammatically correct;

a builder for building a parse tree from said tokenized data declarations;

a symbol table constructing mechanism for constructing a symbol table;

a semantic validation mechanism for traversing said parse tree and checking said tokenized data declarations to ensure that they are semantically correct and supported in a native program environment; and a generator for generating a native data description from said tokenized data declarations and said symbol table.

18. A method for translating data descriptions, said method comprising the machine executed steps of;

reading a first intermediate data description;

grouping said first intermediate data description into sequences of characters that represent individual constructs;

copying a first subset of said individual constructs, said first subset of said individual constructs being parallel language constructs;

translating a second subset of said individual constructs into most comparable language constructs; and generating a second intermediate data description from said parallel language constructs and said comparable language constructs.

19. A method for generating a data description, said method comprising the machine executed steps of:

reading an intermediate data description;

grouping said intermediate data description into sequences of characters that have a collective meaning, said sequences being tokenized data declarations;

analyzing said tokenized data declarations to ensure that they are grammatically correct;

building a parse tree from said tokenized data declarations;

constructing a symbol table;

validating said tokenized data declarations by traversing said parse tree and checking said tokenized data declarations to ensure that they are semantically correct and supported in a native program environment; and generating a native data description from said tokenized data declarations and said symbol table.

* * * * *